United States Patent
Kirschbaum

[15] 3,655,234
[45] Apr. 11, 1972

[54] APPARATUS FOR MOUNTING CAMPER BODY ON A PICKUP TRUCK

[72] Inventor: Larry E. Kirschbaum, 3200 Summit Vista, Des Moines, Iowa 50321

[22] Filed: Oct. 28, 1970

[21] Appl. No.: 84,627

[52] U.S. Cl. ..........................296/23 MC, 296/35 A, 214/515
[51] Int. Cl. ..........................................................B62d 21/14
[58] Field of Search..............246/23, 23 MC, 35 A; 214/512, 214/515

[56] References Cited

UNITED STATES PATENTS 3,409,154 11/1968 Rasmussen ..............................214/515
3,475,049 10/1969 Overhulser .........................296/23 MC Primary Examiner—Philip Goodman
Attorney—Morton S. Adler

[57] ABSTRACT

Apparatus for mounting a camper body to the bed of a pickup truck which includes attaching one or more rigid runners or rails to the underside of the camper body and securing to the bed of the pickup truck a corresponding number of longitudinally arranged and secured tracks. By registration of the front of the runners or rails in the camper with the rear end portion of the tracks on the truck bed, the camper is guided into proper position as the truck is backed up. Suitable securing means are provided to anchor the tracks to the rails and auxiliary securing means are provided for further securing the camper body to the pickup truck frame. Registering rails and tracks may also be used relative to the top of the sideboards on the truck and the portion of the camper body that extends across such sideboards.

12 Claims, 13 Drawing Figures

Patented April 11, 1972
3,655,234
3 Sheets-Sheet 1
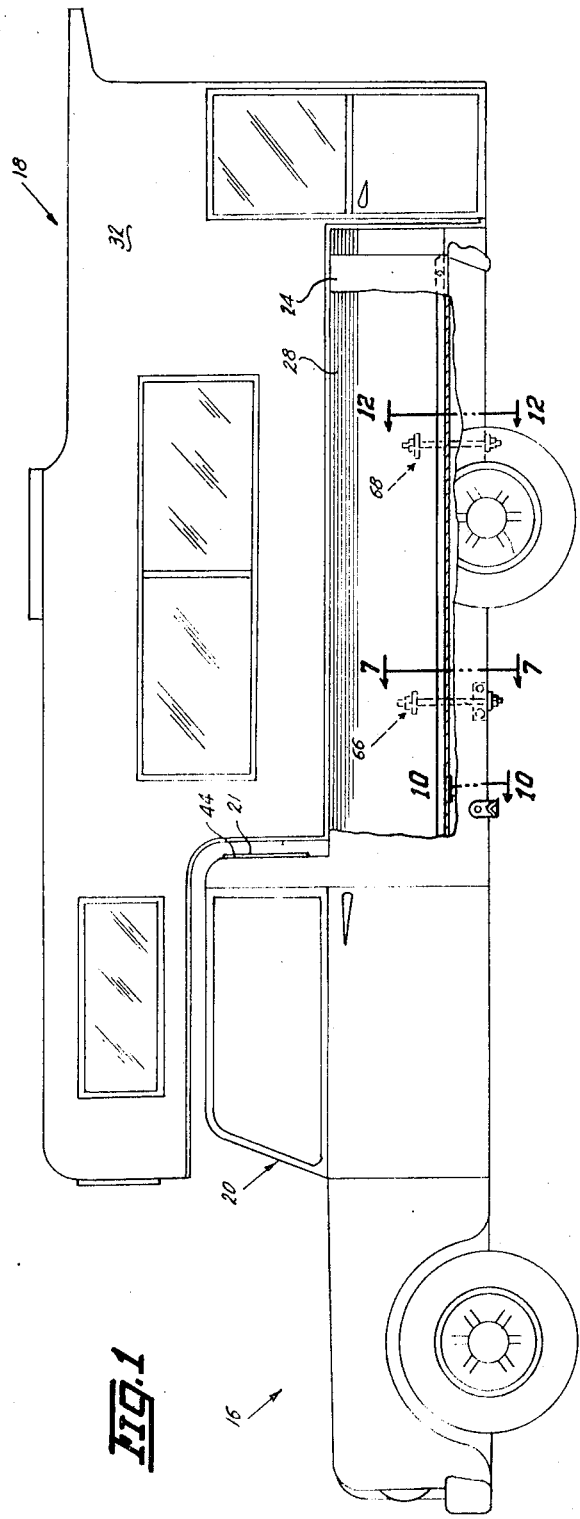
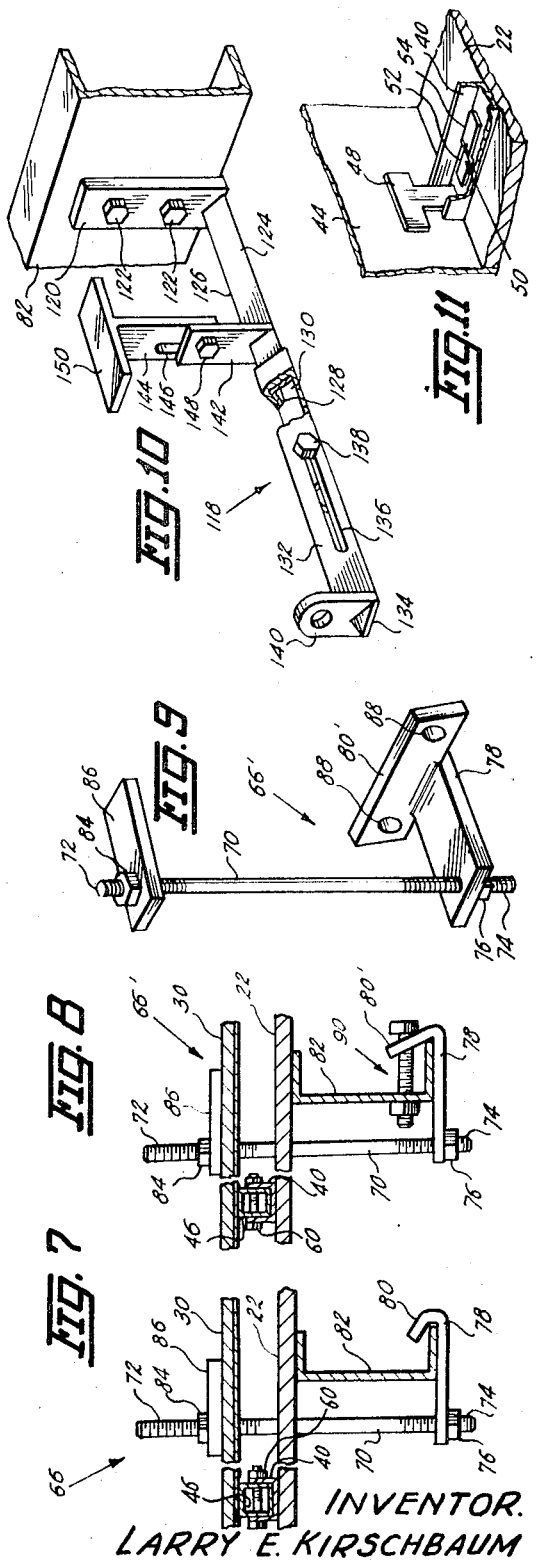
INVENTOR.
LARRY E. KIRSCHBAUM
BY
ATTORNEY.

Patented April 11, 1972
3,655,234
3 Sheets-Sheet 2
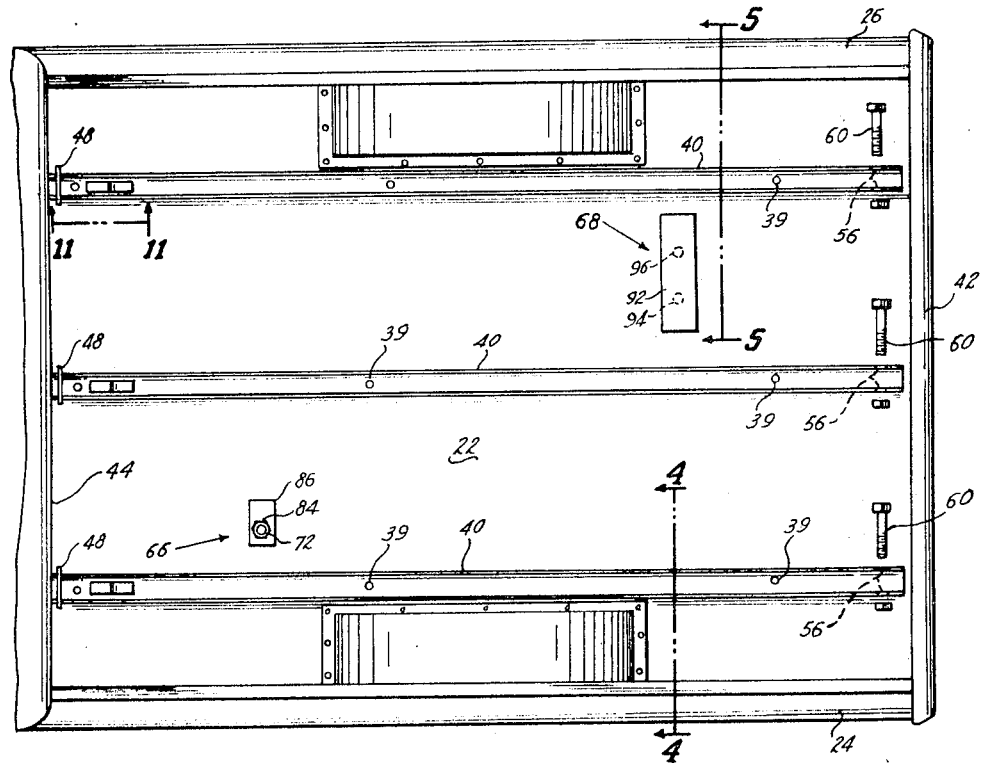
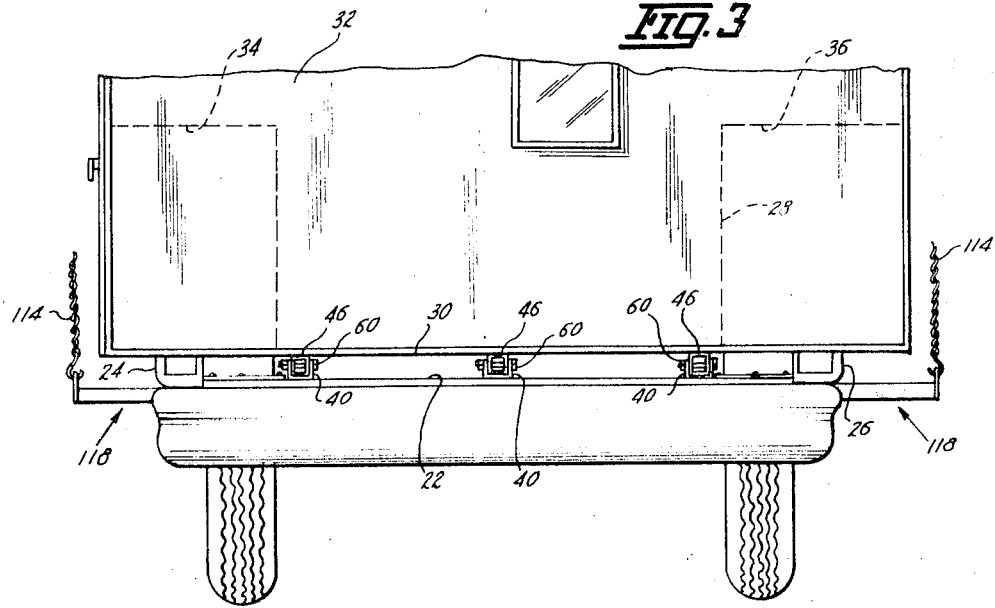
INVENTOR.
LARRY E. KIRSCHBAUM
BY
ATTORNEY.

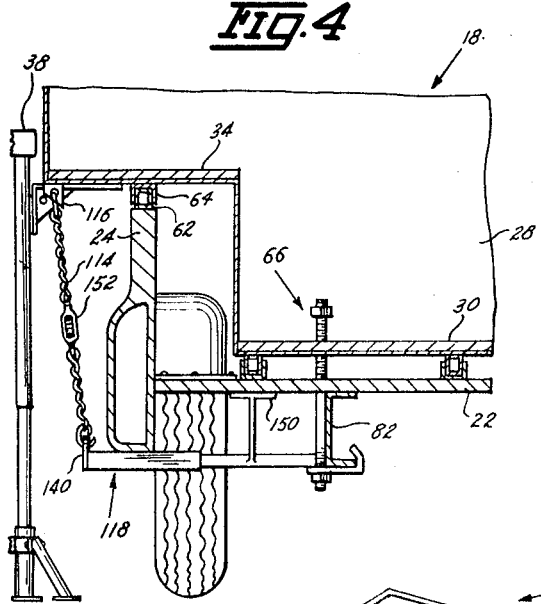
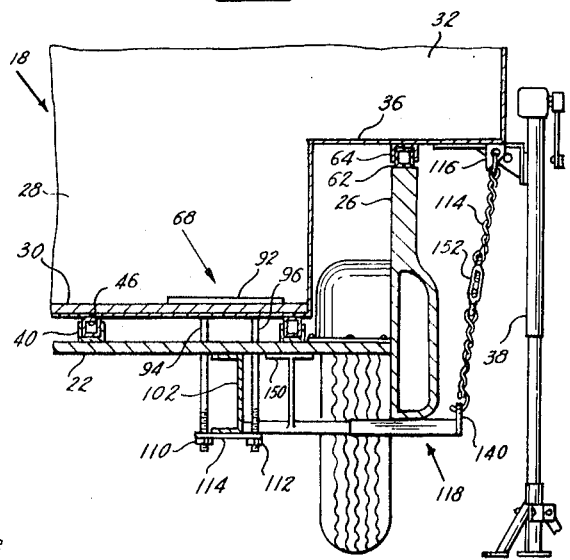
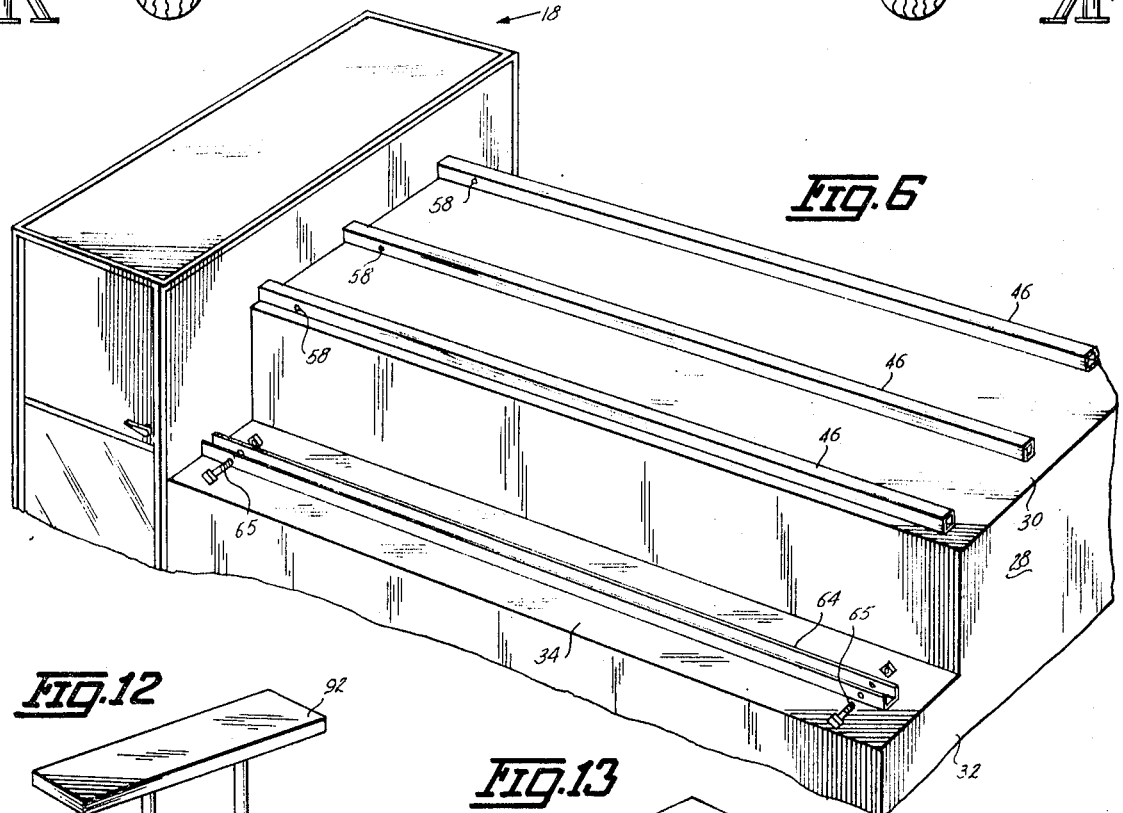
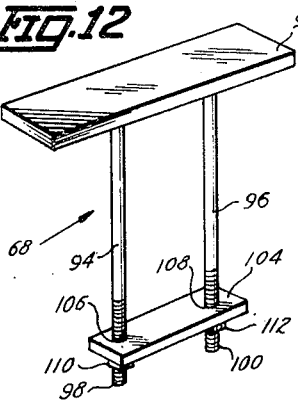
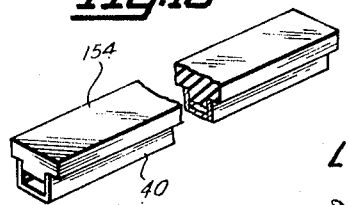
INVENTOR.
LARRY E. KIRSCHBAUM
BY
ATTORNEY.

APPARATUS FOR MOUNTING CAMPER BODY ON A PICKUP TRUCK

BACKGROUND OF THE INVENTION

This invention relates to improvements in means for attaching a camper body to a pickup truck and one of the important objects herein is to provide a safe and secure attachment of the camper body to the pickup truck which can be easily and quickly accomplished.

The phenomenal growth of outdoor camping by the general public has been accompanied by an endless variety of camping equipment including many varieties of trailers, self-contained motor homes and camper bodies for pickup trucks and station wagons. The camper body which is attachably mounted upon a pickup truck is one of extreme popularity since it can be easily removed and the truck can be utilized for its normal purposes when not carrying the camper body. While such camper bodies come in a variety of sizes and shapes in relation to the tailgate and cab of the truck, they are all basically supported on the bed of the pickup truck and for the purposes of safety, must have some form of anchoring devices. In their present form, most camper bodies are usually anchored through the floor of the camper to the bed of the truck and for this purpose, a suitable opening in the floor of the camper must be placed in registration with a corresponding opening in the bed of the truck through which there is then placed an appropriate mounting bolt and plate. In addition, certain chain devices are provided at the sides of the camper body to be engaged with eye bolts generally attached to the side of the truck.

The problem of positioning the camper body on the truck for registration of the securing bolt through the floor of the camper into the bed of the truck is generally a matter which is considerably time consuming for obvious reasons due to the weight of the objects being maneuvered. The presently used chain connections between the camper body and the pickup truck are relatively flimsy and the attachment of eye bolts to the panel sides of a truck are relatively unsafe under undue stresses and strains.

Accordingly, it is the purpose of the present invention to provide a simple but efficient means for properly positioning a camper body in the bed of a pickup truck and to further provide easily attached but extremely sturdy anchor devices for suitably holding the camper body in place and to keep it from sliding, tipping or becoming displaced from the pickup truck.

SUMMARY

In the present invention I have secured one or more and preferably three square tubular rails to the underside of the camper body so as to extend longitudinally from front to rear and on the bed of the pickup truck I have secured a corresponding number of channel-shaped tracks extending longitudinally of the truck bed. This arrangement permits the front end of the rails to be introduced to the rear end of the tracks and by appropriate movement of the truck, the camper body will slide onto the truck bed in proper position. Suitable locking means are provided relative to the front end of the rails and the tracks to keep the camper body from tilting upwardly at the front and, likewise, suitable locking means are provided relative to the rear ends of the rails and tracks. In addition to the rails and tracks operable relative to the truck bed, suitable rails may be secured along the top of the sideboards of the truck to receive channel members secured to the underside portions of the camper body that normally extend across such sideboards.

Once the position of the camper body has been determined on the truck bed, the appropriate floor holes in the camper and in the truck bed for anchoring bolts can be provided and these will always be in alignment when the camper body is mounted by means of the rails. In addition, appropriate anchoring means attached to the frame of the truck are designed to be engaged by suitable chains secured to the camper body.

The objects of this invention together with details of the operation outlined and the advantages of the same will be more fully described and developed in relation to the more detailed description of the accompanying drawings.

BRIEF DESCRIPTION OF THE DRAWINGS

FIG. 1 is a side elevational view showing the camper body mounted on a pickup truck according to this invention and with a portion of the sideboard on the truck partially cut away, FIG. 2 is a top plan view of the bed of the pickup truck as modified for purposes of this invention, FIG. 3 is a rear elevational view showing the lower portion of the camper body arranged relative to the bed of the pickup truck, FIG. 4 is a cross sectional view taken on the line 4—4 of FIG. 2, FIG. 5 is a cross sectional view taken on the line 5—5 of FIG. 2, FIG. 6 is a perspective view of the camper body inverted to show the underside thereof for purpose of this invention, FIG. 7 is a cross sectional view taken on the line 7—7 of FIG. 1 showing the forward anchor bolt used with this invention, FIG. 8 is a view similar to FIG. 7 and showing a second embodiment of the anchor bolt, FIG. 9 is a perspective view of the anchor bolt shown in FIG. 8, FIG. 10 is a perspective view showing a frame mounted adjustable anchor support for one of the tie chains for the camper body taken from the line 10—10 of FIG. 1, FIG. 11 is a perspective view of the forward end of the truck bed mounted track showing the hold down clip for the camper body rail and the auxiliary stop on the rear cab wall for the camper body taken from the line 11—11 of FIG. 2, FIG. 12 is a perspective view of the rear anchor bolt taken from the line 13—13 of FIG. 1 and as also seen in FIG. 5, and FIG. 13 is a perspective view partially cut away to illustrate the cover or cap for the track on the pickup bed when the camper body is not mounted thereon.

DESCRIPTION OF THE PREFERRED EMBODIMENTS

Referring to the drawings, a pickup truck designated generally by the numeral 16 in FIG. 1 is shown as illustrative of the type of vehicle with which this invention is concerned and which is used to support and transport a camper body identified generally by the numeral 18. It will be understood that truck 16 includes a cab 20 with a rear window 21 and an open bed 22 (FIG. 2) closed along the longitudinal sides by the sideboards 24 and 26. It will also be understood that truck 16 normally has an appropriate tailgate which is not shown as the same is removed when a camper body 18 is carried. The camper body 18 is also illustrative only of one form and design and, for purposes of this invention, it is immaterial whether such camper body has a cab overhang or not and whether a rear door is located at the rear or at the side. Camper bodies of the type illustrated at 18 irrespective of their overall upper design include generally a central lower body portion 28 having a floor or bottom 30 with the width of such portion 28 being such as to be readily positionable within the confines of sideboards 24 and 26. The upper portion 32 of camper body 18 projects laterally from each side of the lower section 28 to provide the lateral overhang defined by surfaces 34 and 36 as best seen in FIGS. 4 and 5 and the height of such surfaces relative to the bottom 30 is such that overhang portions 34 and 36 will extend over the top of the truck sideboards 24 and 26.

It will be appreciated that camper body 18 is a rather bulky and heavy piece of equipment and in the customary use of the same, various forms of jacks are provided which are used for engaging the sides of the camper 18 to support it above ground level when it is not truck mounted and also for supporting the camper 18 to permit the backing the truck thereunder to position it within the truck bed. This is all well known for which no invention is claimed per se and one form of such jacks are shown and identified generally by the numeral 38. Conventionally, the truck 16 is backed under the jacked up camper body until the central portion 28 is within the confines of the truck bed and the jacks are then removed. Thereafter, the bottom 30 is anchored to the truck bed by some suitable anchor bolt and some form of chains are engaged between the sides of the camper body and an attaching point on the side panels of the sideboards. This requires accurate registration of complementary openings in the bottom of the camper body and the bed of the truck to receive the anchor bolt and due to the weight and bulk of the camper body 18 this all too frequently becomes a very time consuming problem. Consequently, one of the important objects of the present invention is to simplify the mounting of the camper body 18 within the truck body and at the same time provide substantially more secure and safe anchoring devices than those which are presently available.

With reference now to FIG. 2, I have secured to the truck bed floor 22 by any suitable means such as bolts 39, one or more channeled tracks 40 parallel to the longitudinal axis of the truck. Preferably, as seen in FIG. 2, I have provided three tracks 40 in spaced parallel relationship and these extend from the rear end 42 of bed 22 to the rear wall 44 of the cab 20.

To the underside of the bottom 30 of the central lower camper portion 28, I have secured one or more elongated square tubular rails 46 corresponding in number to the number of tracks 40. Rails 46 are similarly spaced and arranged as tracks 40 and extend longitudinally of bottom 30 as best seen in FIG. 6.

The cross sectional dimension of rails 46 are such as to permit them to be closely seated within tracks 40 as is seen in FIG. 3 and they are also longitudinally slidable therein as will appear. At the forward end of tracks 40, a stop member 48 is secured to the rear cab wall 44 and preferably extends above and outwardly relative to tracks 40 in a T shape as seen in FIG. 11. Just forwardly of stop 48 and within the tracks 40 there is secured a second stop member 50 in the form of an elongated bar having a forward portion 52 secured to the bottom of the channel 40 and a rearwardly extending vertically offset hook portion 54 that is spaced upwardly from the floor of such channel. Thus far described, the camper body 18 is placed in position on the truck bed 22 as follows. Body 18 will be suitably supported by jacks 38 so that the truck 16 can be backed in to place whereby the forward end portions of rails 46 are placed in registration with the rear portion of tracks 40 at which time the jacks 38 can be lowered so that rails 46 are nested within the tracks 40 in the relative position seen in FIG. 3. With the rails and tracks thus aligned, the truck can be moved rearwardly whereby the tracks 40 will slide relative to the rails 46 and serve as guides therefor to properly position the camper body 18 in the bed of the truck. A suitable lubricant may be applied to either or both the tracks 40 and rails 46 for obvious reasons. Since the rails 46 are square tubes, the lower side of the forward portion of such rails will slide under portion 54 of stop 50 and define the forward position of the camper body. To avoid the possibility of stops 50 becoming broken from too great a contact by the movement of rails 46, I preferably provide the additional stop 48 which can be observed by the truck operator out of the rear cab window and thus the operator can observe as the forward part of the lower camper section 28 approaches stop 48 and thereby slow down the movement of the truck accordingly. By this arrangement, the point of abutment of camper 18 with stop 48 is designed to correspond to the point of abutment of rail 40 with stop 50. Stop 50 in addition to serving as a stop means also serves as a locking means to prevent any upward movement or tilting of camper 18 at the forward end by the engagement of the lower side of rail 46 with the underside of member 54 of stop 50.

When the position of camper body 18 on the truck bed 22 has been initially determined as described, I provide for a locking arrangement at the rear as follows. Holes 56 are formed in the opposed channel sides of rails 40 at the rear and registering holes 58 are likewise formed through rails 46 at the rear so that the rails 46 in tracks 40 can be locked together by means of a nut and bolt assembly 60 as seen in FIG. 3. It will thus be appreciated as thus far described that camper body 18 is not only easily but accurately positioned within the truck bed but is also anchored both at the forward and rear ends. Thereafter, when the camper body is removed and remounted, the holes 56 in tracks 40 and the holes 58 in rails 46 will always be in registration when the forward ends of the rails are engaged against stop 50 as described.

The track and rail assembly described above can also be applied to the upper edge of the truck sideboards 24 and 26 and the underside of the camper body overhang 34 and 36. In this arrangement, a tubular rail member 62 as seen in FIGS. 4 and 5 is suitably secured along the upper surface of the sideboards 24 and 26 and in a corresponding position on the underside of the overhang surfaces 34 and 36 there is secured a suitable inverted channel member 64 which have a nesting and sliding relationship with the rails 62 in the same manner as described for tracks 46 and rails 40 and once in place, as secured against displacement by nut and bolt units 65. In further regard to such track and rail assemblies, it is pointed out that tracks 46 and 40 within the truck bed may be utilized without the rails 62 and tracks 64 on the sideboard and overhangs and that the reverse situation may also be used, if desired.

Because of the weight of camper body 18 and the stresses and strains to which it is subjected in traveling, I provide certain additional anchoring devices which materially add to the safety and protection of the camper body and which are not presently available on equipment of this type and which I shall now describe.

I have provided a forward anchor bolt 66 and a rear anchor bolt 68 located generally relative to the truck bed as seen in FIG. 1. Bolt 66 is illustrated in more detail in FIG. 7 and bolt 68 is shown in FIG. 12. Both of the anchor bolts 66 and 68 are designed to firmly secure the floor of the camper body 18 to the truck bed and frame and the exact location in the floor 30 and the bed 22 at which bolts 66 and 68 are secured is not determined until the camper body is initially positioned on the truck bed as previously described and at which time registering holes in floor 30 and bed 22 for bolts 66 and 68 can be formed so that in subsequent mountings of the camper body there will be no requirement for any maneuvering or manipulation thereof.

With reference more particularly to FIG. 7, anchor bolt 66 is what I have referred to as a J clamp and includes an elongated shank 70 having the respective threaded ends 72 and 74. To the lower end of shank 70 there is secured by means of a nut 76 the lateral projecting arm 78 that terminates in a hook portion 80 bent back and upwardly relative to the main arm portion 78. As seen in FIG. 7, there is shown the relative positions of the bed 22 to a conventional channel-shaped frame member 82 of the truck together with the bottom 30 of the camper body 18 in its relative position to bed 22. Anchor bolt 66 is arranged as shown in FIG. 7 by passing shank 70 upward through the registering holes in bed 22 and floor 30 and engaging the hook 80 over the bottom flange of frame portion 82. A suitable nut 84 and bearing plate 86 are applied to bolt end 72 to secure it against floor 30 as shown and in this regard, it is pointed out that the area of floor 30 where nut 84 is secured is, for convenience, a portion of the floor area in a storage compartment that may contain amongst other things a hot water heater or other items.

In FIGS. 8 and 9 a modified form of anchor bolt 66 is shown and is designated as 66' and like parts are given like numerals as for anchor bolt 66 and other comparable parts are given like numerals primed. In anchor bolt 66' the counterpart of hook 80 of anchor bolt 66 is a substantially upstanding plate 80' only slightly inclined toward shank 70 and being provided on opposite ends with the transverse openings 88 for receiving a nut and bolt unit 90 as seen in FIG. 8 which may be directly attached to the truck frame 82 if desired.

Anchor bolt 66 as described is preferably on the forward left side of the camper body relative to the direction of forward travel and anchor bolt 68 as seen in FIGS. 5 and 12 is applied to the right rear portion of the camper body as follows. Such bolt 68 includes a top plate 92 to which is secured a pair of spaced depending rods or shank members 94 and 96 which are threaded at their lower ends as at 98 and 100. To receive rods 94 and 96 after camper body 18 has initially been installed in the truck bed as described, registering holes will be provided in floor 30 and bed 22 so that rods 94 and 96 can be inserted downwardly from within the camper body as seen in FIG. 5. In this position, the lateral spacing of rods 94 and 96 is such that it will straddle the truck frame portion 102 and the threaded ends 98 and 100 are of sufficient length to extend below the bottom flange of frame portion 102. A holding plate 104 provided with suitable holes 106 and 108 is fitted on to ends 98 and 100 of rods 94 and 96 below frame 82 and secured against the lower flange of such frame portion by suitable nuts 110 and 112. The location of anchor bolt 68 will be also be on a floor area within one of the conventional cabinets or storage compartments which are readily available in the camper bodies of the type involved and such storage areas may be under a sink or drawer or any other convenient place. Thus, from the above description of anchor bolts 66 and 68 it will be appreciated that in addition to the tie-down means provided by stop 50 and bolt and nut assembly 60 as previously described, the security of attachment of the camper body to the truck bed 62 is considerably amplified by anchor bolt 66 engaged with the truck frame at the forward left side portion of the camper and the anchor bolt 68 engaged with the truck frame at the rear right portion thereof.

With reference more particularly to FIGS. 4 and 5 the like tie-down chains 114 are customarily found on campers of this type. As generally presently used, such tie-down chains are suitably connected at one end as at 116 to the overhang portions of the camper and at the other end are generally attached to an eye bolt (not shown) secured to the side panels of the sideboards 24 and 26. It is well recognized that such sideboard panels are relatively flimsy in relation to the weight of the camper body and any forces or stresses that would be applied to chains 114 and, accordingly, I have materially improved the safety and security of chains 114 by chain anchor units to be secured to the frame of the truck and identified generally by the numeral 118 as best seen in FIG. 10. The chain anchor units 118 are usable on both sides of the truck and are of like construction and will be described in reference to the left side of the truck as seen in FIG. 10. At one end, unit 118 has an upstanding bar 120 suitably secured as by bolts 122 to the vertical surface of truck frame 82 which, on the other side of the truck as seen in FIG. 5 will be frame member 102. Secured to the bottom of bar 120 is one end of a triangular arm 124 extending horizontally away from frame 82 toward the adjacent truck side thereof. The apex 126 of arm 124 defines the upper plane of such arms so that the bottom surface of such arms presents the two longitudinal edges 128 and 130. On the outer end of arm 124 there is preferably a hollow triangular arm extension 132 having a closed bottom 134 and adapted for a slipfit sliding relationship on arm 124. The purpose of extension 132 is to make anchor 118 adaptable for different size trucks and it will be understood that anchor 118 can also be fabricated in different sizes, if desired, so that a separate extension 132 would not be necessary. One side of extension 132 is provided with an elongated slot 136 in which there is arranged a set screw 138 to hold extension 132 immovable relative to arm 124 in different positions of longitudinal adjustment thereon. The outer extremity of extension 132 is provided with an upstanding apertured ear 140 to which the lower end of chains 114 can be suitably engaged. Intermediate bar 120 and arm extension 132 there is secured on arm 124 a vertical plate 142 to which a second vertical plate 144 having an elongated vertical slot 146 is vertically adjustably secured to plate 142 by means of a bolt and nut 148 and integral with the top of plate 144 is the transverse abutment plate 150. In the use of chain anchor unit 118, it will be seen that the abutment plate 150 is at an intermediate position between the truck frame 82 and the point of chain attachment 140 and such plate 150 is vertically adjusted so that it will bear against the underside of truck bed 22 as best seen in FIGS. 4 and 5. By the above arrangement, when there is a strain or strong pulling force of chains 114 against ear 140, the solid bottom 134 of arm extension 132 will bear against the spaced edges 128 and 130 on arm 124 and the abutment plate 150 will provide a resistance and support for arm 124 so as to reduce and substantially eliminate the possibility of arm 124 becoming bent or broken. It will thus be appreciated that with the use of a chain anchor unit 118 as described, such chains 114 are suitably anchored relative to the truck frame rather than to a relatively unsafe attachment to the side panels of the truck. Adjustments of chains 114 are provided by turnbuckles 152 in a well known manner.

With reference to FIG. 13, an elongated cap 154, T shaped in cross section, is provided for a friction fit with tracks 40 when the camper body 18 is removed and serves to keep the tracks free of foreign matter that could otherwise accumulate when the truck is used for hauling miscellaneous materials.

Thus, from all of the foregoing it is thought a full understanding of the construction and operation of this invention will be had and the advantages of the same appreciated.

I claim:

1. Apparatus for facilitating the mounting and securing of a camper body to a pickup type truck wherein said truck includes a frame mounted forward cab portion and an elongated horizontal rear bed, said bed being defined at the front by a rear cab wall, at the sides by upstanding sideboards and being open at the rear, and said camper body having a lower central portion enclosed by a floor to fit within said sideboards and an upper portion having lateral overhangs at respective sides relative to said lower sections to extend over said sideboards, said apparatus comprising:

a track member secured to said bed so as to extend longitudinally from the rear of said bed to the rear wall of said cab, a rail member secured to the underside of said floor so as to extend longitudinally thereon in the same direction as said track member, means for supporting said camper body above ground level so that said truck can be maneuvered to a position where the forward end of said rail member nests in the rear end of said track member, the rearward movement of said truck causing said track member to slide relative to said rail member to guide said camper body onto said bed into a predetermined position, stop means at the forward end portion of said track member engageable by said rail member defining the position where the respective rear ends of said track and rail members are substantially planar with each other, and means for releasably locking said track member and rail member against relative movement and displacement.

2. Apparatus as defined in claim 1 where said means for releasably locking said track member and said rail member comprises:

said stop means having a rearwardly extending hook portion for engaging the forward end of said rail member to hold it against vertical displacement from said track member, and bolt and nut means detachably secured through said track and rail members near the rear thereof.

3. Apparatus as defined in claim 1 including:

a second stop means on the rear wall of said cab in longitudinal alignment with the forward extremity of said track member, a rear window in said cab, said second stop means being visible through said window from within said cab, said second stop means disposed to be abutted by the lower forward end of the central portion of said camper body in the movement of said track member relative to said rail member, and the abutment of said central portion with said second stop means being simultaneous with the engagement of said rail member with said first mentioned stop means.

4. Apparatus as defined in claim 1 including:
an anchor bolt comprising:
   an elongated member,
   an arm extending perpendicularly from one end of said elongated member and terminating in a truck frame engaging hook end,
   said elongated member removably extended upwardly through said truck bed and floor of said central portion with said hook end removably engaged with said truck frame, and
   means for detachably securing said other end of said elongated member to said floor.

5. Apparatus as defined in claim 1 including:
an anchor bolt comprising:
   a plate for engaging the floor of said central portion,
   a pair of elongated spaced rods depending from said plate,
   said rods extending downwardly through said floor and said bed astraddle the truck frame,
   a second plate detachably mounted to the lower ends of said rod so as to abut said frame, and
   means for securing said second plate to said rods.

6. Apparatus as defined in claim 1 including:
a first anchor bolt, comprising:
   an elongated member,
   an arm extending perpendicularly from one end of said elongated member and terminating in a truck frame engaging hook end,
   said elongated member removably extended upwardly through said truck bed and floor of sand central portion at one side of the forward portion thereof with said hook end removably engaged with said truck frame,
   means for detachably securing said other end of said elongated member to said floor,
a second anchor bolt comprising:
   a plate for engaging the floor of said central portion at the other side of the rear portion thereof,
   a pair of elongated spaced rods depending from said plate,
   said rods extending downwardly through said floor and said bed astraddle the truck frame,
   a second plate detachably mounted to the lower ends of said rod so as to abut said frame, and
   means for securing said second plate to said rods.

7. Apparatus as defined in claims 1 including:
said track member being a channel, and
an elongated cap member removably nested in said track member when said camper body is out of engagement with said truck.

8. Apparatus as defined in claim 1 including:
a tie-down chain detachably secured at one end to the overhang at one side of said camper body,
a chain anchor comprising:
   a plate detachably secured to the truck frame,
   a rigid horizontal arm secured at one end to said plate so as to extend toward the side of said truck relative to said chain,
   the extremity of said arm being engaged by the other end of said tie-down chain, and
   a vertically adjustable plate on said arm for engagement with the underside of said truck bed.

9. Apparatus as defined in claim 8 including:
an arm extension slidably mounted on said arm to selectively adjust the length thereof,
chain engaging means on the extremity of said arm extension engaged by the other end of said tie-down chain, and
means on said arm extension to selectively hold it against movement relative to said arm.

10. Apparatus for facilitating the mounting and securing of a camper body to a pickup type truck wherein said truck includes a frame mounted forward cab portion and an elongated horizontal rear bed, said bed being defined at the front by a rear cab wall, at the sides by upstanding sideboards and being open at the rear, and said camper body having a lower central portion enclosed by a floor to fit within said sideboards and an upper portion having lateral overhangs at respective sides relative to said lower sections to extend over said sideboards, said apparatus comprising:
respective track members secured to the underside of the respective overhangs so as to extend longitudinally thereon,
respective rail members secured to the upper edge of said respective sideboards in longitudinal alignment therewith,
means for supporting said camper body above ground level so that said truck can be maneuvered to a position where the forward end of said track members nest over the respective rear ends of said rail members,
the rearward movement of said truck causing said rail members to slide relative to said track members to guide said camper body onto said bed into a predetermined position, and
means for releasably locking said track members and rail members against relative movement and displacement.

11. A method for facilitating the repeated mounting and removal of a camper body to the bed of a pickup truck which comprises:
providing the truck bed and camper bottom with complementary interacting guide means,
supporting the camper body above ground level,
maneuvering the truck relative to the camper body,
lowering the camper body so as to effectively associate the complementary guide means,
moving the truck toward the camper body to position the camper body thereon,
providing stop means at a predetermined position on the truck to define the mounted position of the camper body,
designating an anchor point relative to the camper bottom and truck bed and drilling registering holes at such point through said bed and bottom,
securing an anchor device through said holes, and
securing said anchor device to the camper bottom and truck frame.

12. A method as defined in claim 11 including:
securing said anchor at a predetermined point at one side of the forward portion of the camper body, and
designating a second anchor point and securing a second anchor similarly as said first mentioned anchor at the other side of the rear portion of the camper body.

* * * * *